Figure 1:
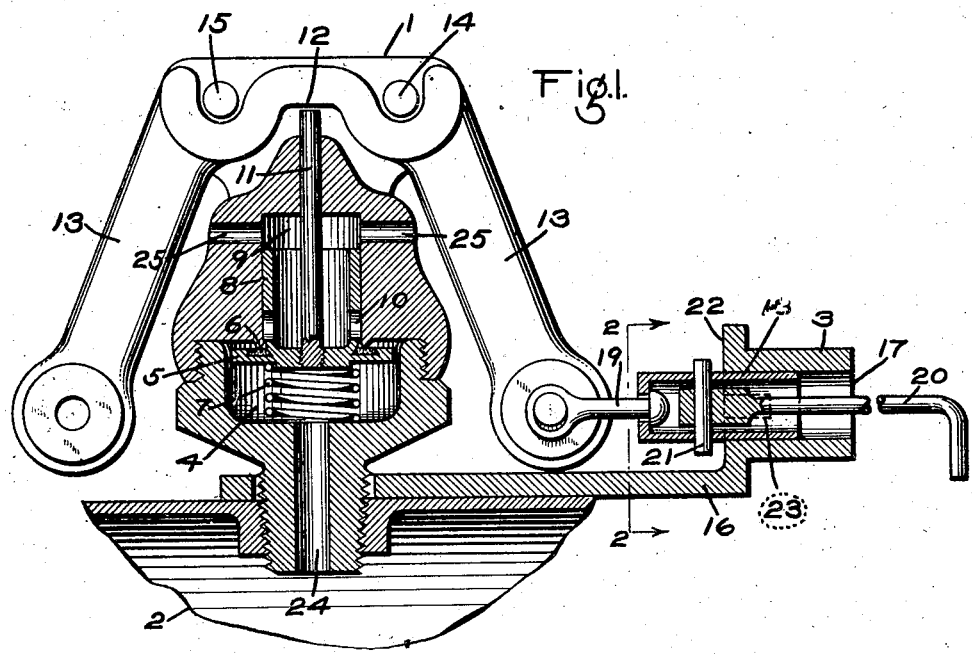

Oct. 4, 1927.

C. C. FARMER 1,644,571

RELEASE VALVE DEVICE

Filed Dec. 21, 1926

INVENTOR
CLYDE C. FARMER
BY *Wm. M. Cady*
ATTORNEY

Patented Oct. 4, 1927.

1,644,571

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

RELEASE-VALVE DEVICE.

Application filed December 21, 1926. Serial No. 156,138.

This invention relates to fluid pressure brakes, and in particular to an auxiliary reservoir release valve device.

In the usual standard fluid pressure brake equipment a manually operated release valve device is employed to vent fluid under pressure from the auxiliary reservoir to the atmosphere, said release valve device having only one open position, so that the flow of fluid under pressure from the auxiliary reservoir to the atmosphere is always at the same rate.

Before a car is cut off from a train, as in switching, the fluid under pressure in the brake pipe is vented to the atmosphere, thereby causing an application of the brakes on that car, and to release said application of the brakes so as to be able to move said car the fluid pressure is vented from the auxiliary reservoir, so that a release of fluid from the brake cylinder may take place. Under such conditions the venting of the fluid from the auxiliary reservoir to the atmosphere should be rapid to facilitate quick train handling.

There are circumstances, however, under which the opening of a large passage from the auxiliary reservoir to the atmosphere is unnecessary and undesirable, as for example in releasing brakes which have become stuck due to the pressure of the fluid in the auxiliary reservoir being higher than the brake pipe pressure, as occasionally occurs on the head end of a train, when the release position of the brake valve device is employed to partially charge the brake pipe and auxiliary reservoirs. In using release position of the brake valve device to charge the brake pipe, fluid at main reservoir pressure flows directly to the brake pipe and raises said brake pipe pressure to a degree higher than the setting of the feed valve device. If the brake valve device remains in release position long enough, the auxiliary reservoirs on the front portion of the train also become charged to a pressure higher than the setting of the feed valve device, so that when the brake valve device is moved from release to running position, in which position the brake pipe pressure is maintained at the feed valve setting, the higher pressure in the auxiliary reservoirs at the front of the train shifts the triple valve devices to service position and applies the brakes. To release such an application of the brakes the auxiliary reservoir pressure is reduced through a release valve device to a degree lower than the brake pipe pressure, so that the higher brake pipe pressure will shift the triple valve device to release position. With the standard release valve device having only one open position, an unnecessary amount of fluid from the auxiliary reservoir may be vented to the atmosphere.

The principal object of my invention is to provide an improved release valve device having two open positions, one position providing a large venting passage and the other position providing a small venting passage.

Figure 2:
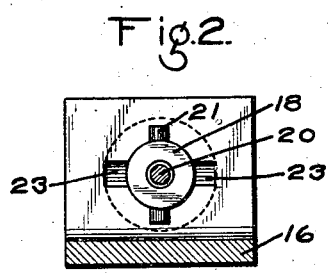

In the accompanying drawing; Fig. 1 is a sectional view of a release valve device applied to an auxiliary reservoir and showing my invention applied thereto; and Fig. 2 a section on the line 2—2 of Fig. 1.

According to the drawing, the release valve device 1 may comprise a casing having a threaded plug adapted to be screwed into the auxiliary reservoir 2 and having a chamber 4 containing a valve 5, adapted to normally seal against a seat ring 6 due to the pressure of the spring 7. Integral with said valve is a hollow cylindrical valve guide 8 adapted to operate in chamber 9 and having ports 10. A stem 11 is secured to said valve and extends through the casing and is adapted to be engaged by the face 12 of an operating lever 13 as said lever is turned about either the fulcrum pin 14 or the fulcrum pin 15.

A bracket 16 secured to the auxiliary reservoir 2 is provided with a chamber 17 containing a slidable and rotatable member 18 connected to the lever 13 by a link 19, said link having a swivel joint connection to the member 18. Extending into the member 18 is an operating rod 20, which is secured thereto by a pin 21, the ends of the pins protruding through the opposite sides of the member 18.

With the operating rod 20 in the position shown in Fig. 1, the pin 21 is adapted to engage the face 22 of the bracket 16 and thus limit the outward travel of the member 18. With the bent handle end of the rod 20 turned to a horizontal position, or 90° from the position shown in Fig. 1, the pin 21 is adapted to enter the slots 23 in the cylindrical portion of said bracket and thereby permit a greater outward travel of the member 18.

In operation, to slowly vent the fluid under pressure from the auxiliary reservoir to atmosphere, the operating rod 20 and member 18 are pulled to the right until the pin 21 strikes face 22 of the bracket 16. The lower end of lever 13 is moved a corresponding amount, and said lever 13 turning about the fulcrum 14 causes the face 12 of said lever to engage the valve stem 11 and thereby move the valve 5 downwardly to a limited extent, thereby unseating said valve. Fluid from the auxiliary reservoir 2 being supplied to chamber 4 through passage 24 of the release valve device, then flows past the open valve 5, through the partially opened ports 10 in the hollow cylindrical valve guide 8 and thence into chamber 9, and then through passages 25 to the atmosphere, thereby permitting a slow venting of fluid from the auxiliary reservoir.

To quickly vent the fluid under pressure from the auxiliary reservoir to the atmosphere, the operating rod 20 is turned 90° and then pulled to the right. In this case, the pin 21 does not engage the face 22 of the bracket 16, but instead enters the openings 23 in said bracket and permits a greater movement of said operating rod 20 to the right, thus causing a correspondingly increased movement of the valve 5 and an increased opening of the ports 10. As a result, an increased rate of flow occurs from chamber 4 and the auxiliary reservoir 2, to chamber 9 and thence to atmosphere through passages 25, thereby more quickly venting the fluid under pressure from the auxiliary reservoir.

Having now described my invention, what I claim as new and desire to secure by Letters Patent, is:—

1. In a fluid pressure release valve device, the combination with a release valve, of a member for operating said valve, means for limiting the opening movement of said valve by operation of said member to limit the rate of release of fluid, and means for permitting a greater movement of said member to provide an increased opening movement of said valve.

2. In a fluid pressure release valve device, the combination with a valve member having a port, of means for operating said member to open said port for releasing fluid under pressure, means for limiting the movement of said operating means and thereby the extent said port is opened, and means for rendering said limiting means ineffective.

3. In a fluid pressure release valve device, the combination with a valve member having a port, of an operating member operatively connected to said valve member, a stop for limiting the movement of said operating member, said stop being rendered ineffective upon a predetermined movement of said operating member.

4. In a fluid pressure release valve device, the combination with a valve member having a port, of a rotatable operating member movable longitudinally to operate said valve member to open said port, a stop for limiting the longitudinal movement of said operating member and thereby the extent said port is opened, said stop being rendered ineffective to limit the longitudinal movement of said operating member upon a predetermined rotative movement of said operating member.

5. In a fluid pressure release valve device, the combination with a valve member having a port, of a casing, a member mounted in said casing to rotate and move longitudinally in said casing and operatively connected to said valve member, a pin carried by said operating member and adapted to engage said casing to limit the longitudinal movement of said operating member, said casing having slots for receiving said pin upon a rotative movement of said operating member, so as to permit a further longitudinal movement of said operating member.

6. An auxiliary reservoir release valve device comprising a casing, a release valve mounted in said casing, a sleeve movable with said valve and having a port adapted to be opened when said valve is unseated, and means for operating said valve.

7. An auxiliary reservoir release valve device comprising a casing having a valve chamber, a release valve mounted in said chamber and adapted for engagement with an annular seat, a sleeve carried by said valve and having a release port through which fluid is released when said valve is moved away from its seat, and means for operating said valve.

8. An auxiliary reservoir release valve device comprising a casing having a valve chamber, a release valve mounted in said chamber and adapted for engagement with an annular seat, a sleeve carried by said valve and having a release port through which fluid is released when said valve is moved away from its seat, an operating member for said valve, means for normally limiting the movement of said operating member and thereby the opening movement of said valve, and means for rendering said limiting means ineffective.

In testimony whereof I have hereunto set my hand.

CLYDE C. FARMER.